A. COHN & L. M. KRONHEIMER.
GLUE APPLYING MACHINE.
APPLICATION FILED MAY 1, 1909.
963,033.
Patented July 5, 1910.
6 SHEETS—SHEET 1.
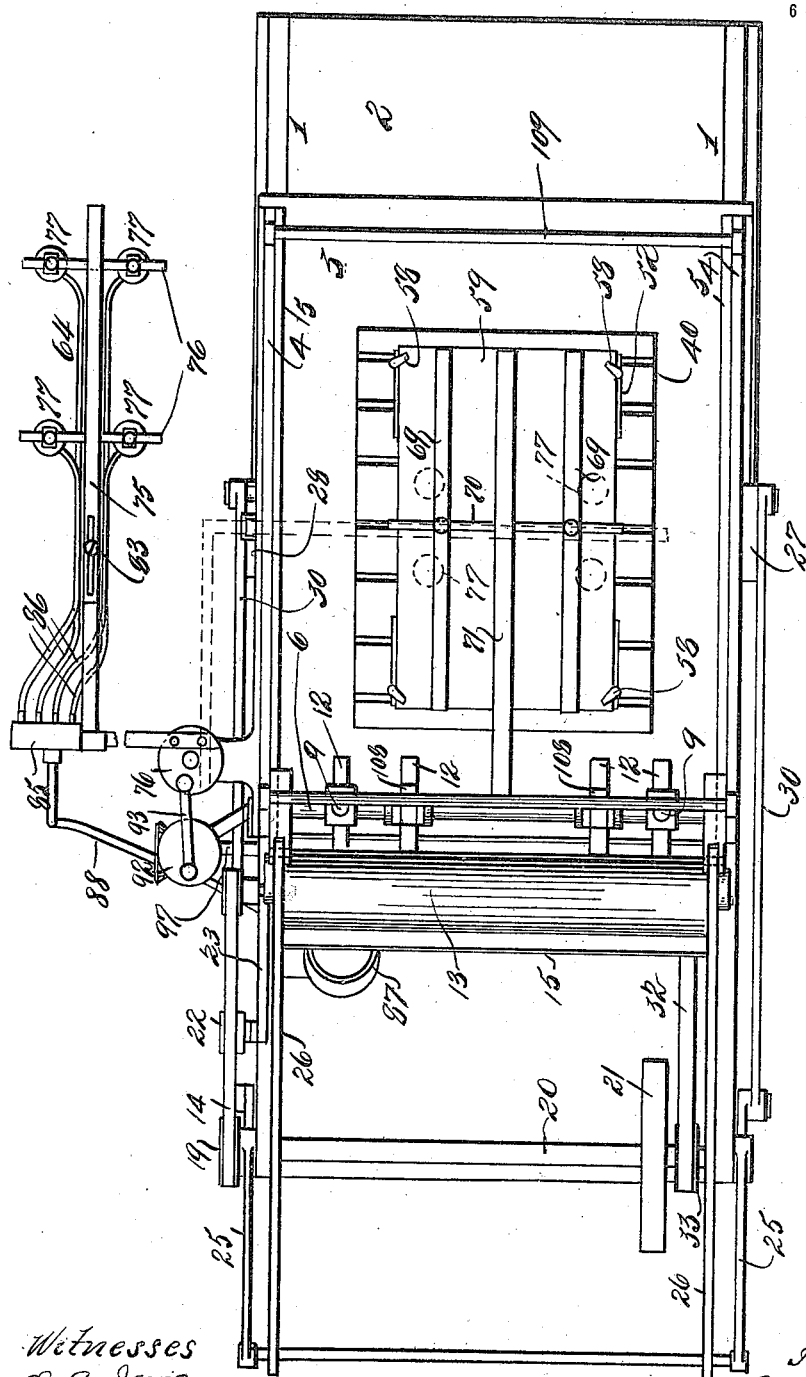
Fig. I.
Witnesses
C. A. Jarvis
Estelle Hamburger
Inventors:
Arnold Cohn,
Louis M. Kronheimer
by
Attorney.

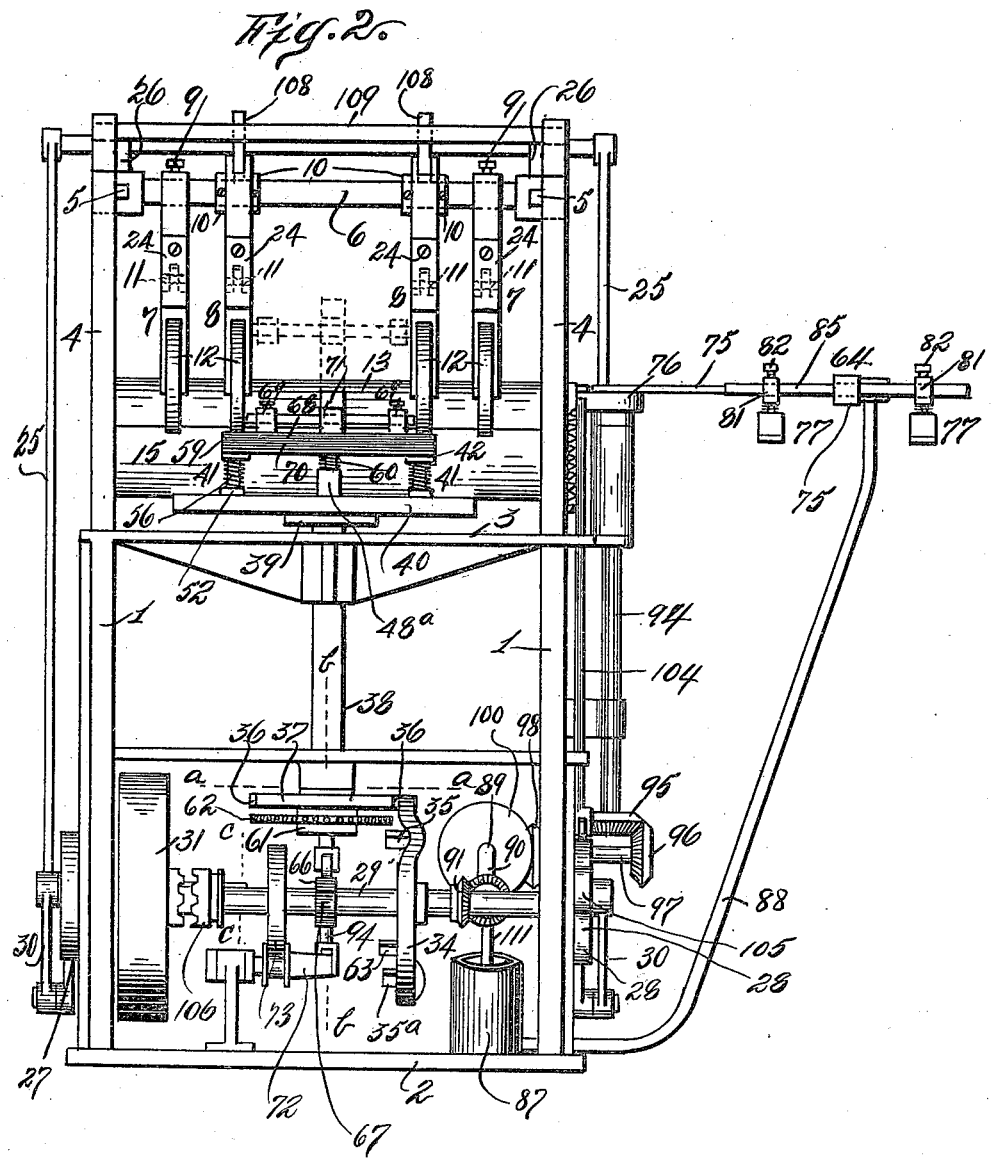

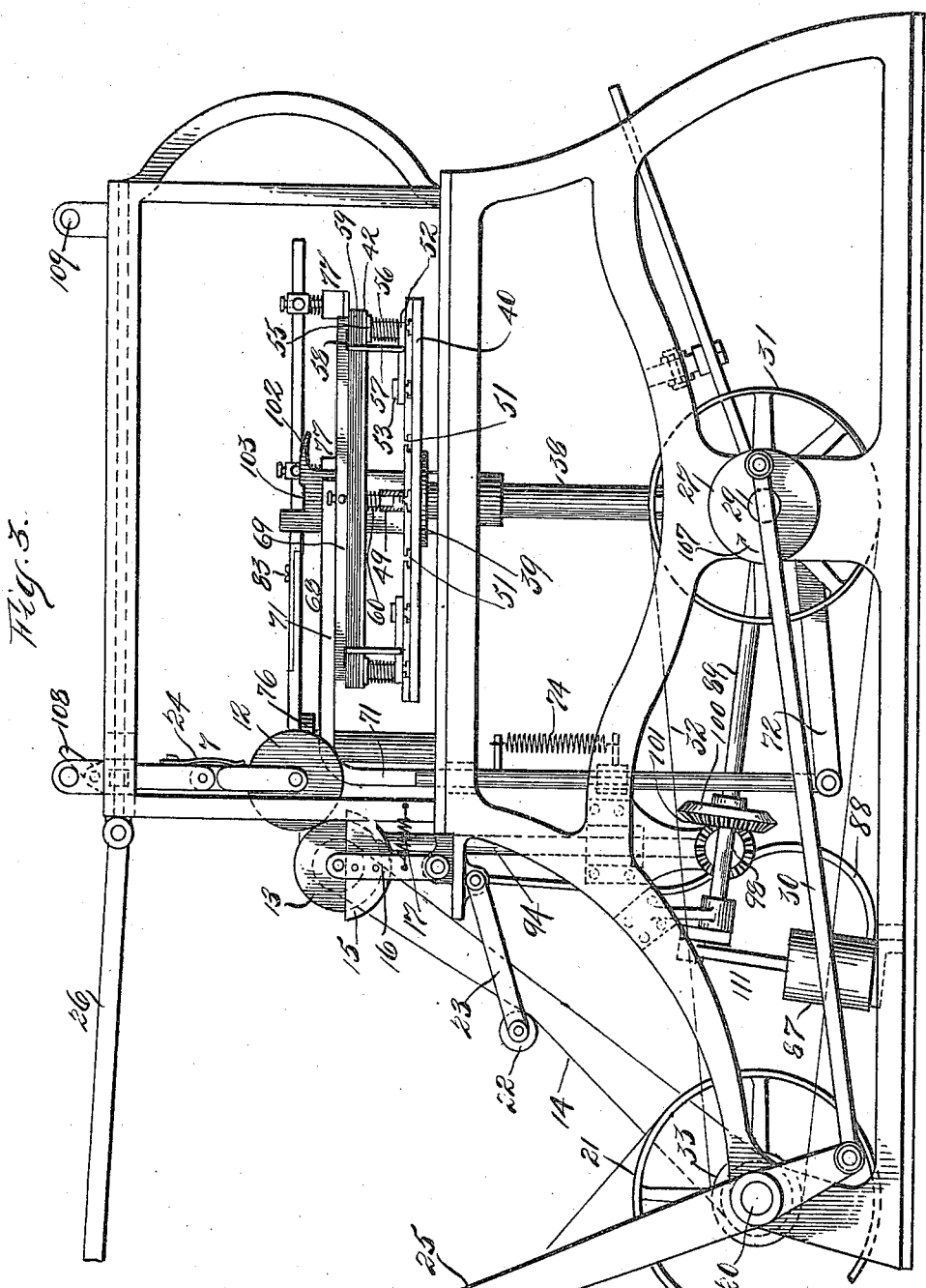

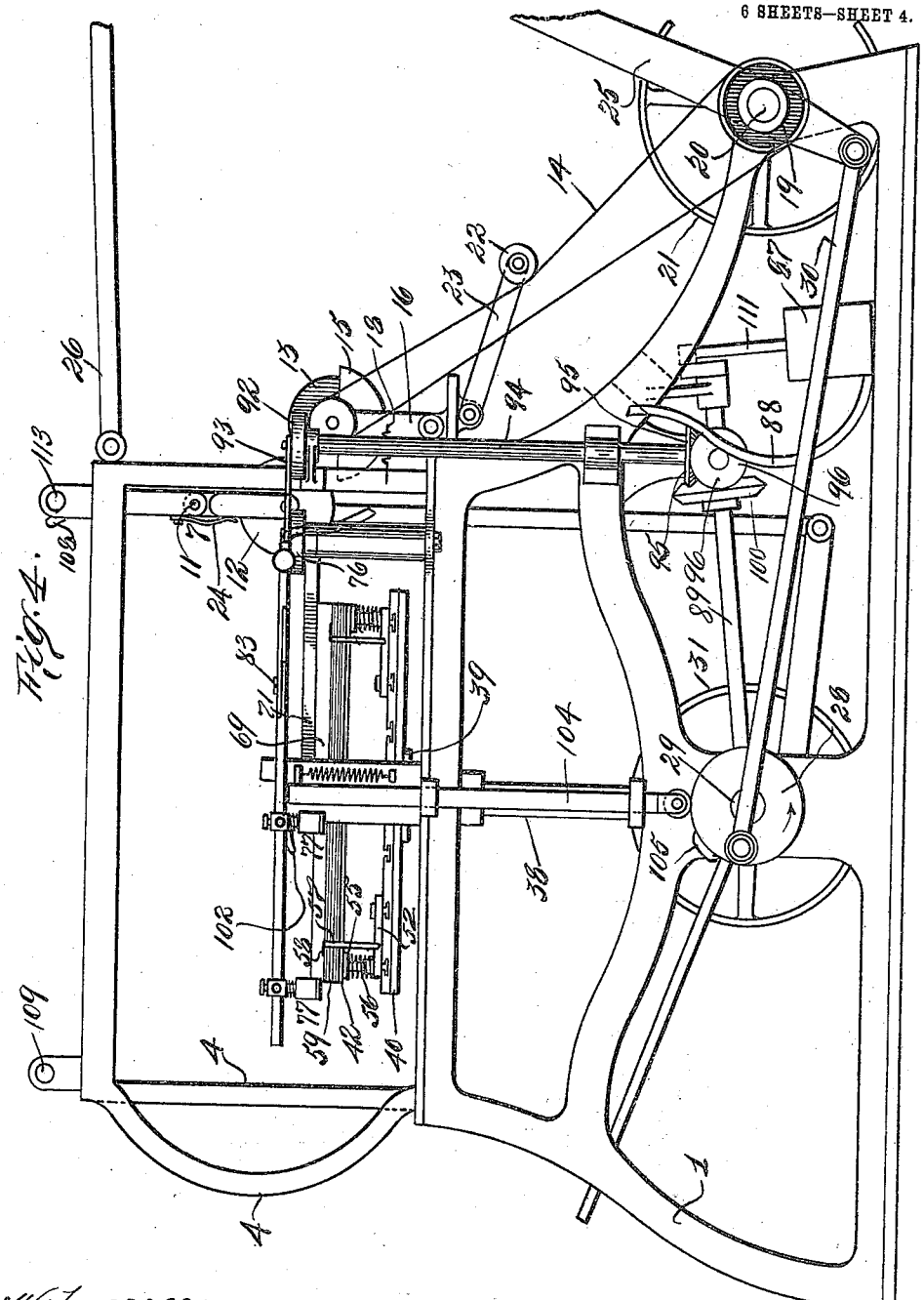

A. COHN & L. M. KRONHEIMER.
GLUE APPLYING MACHINE.
APPLICATION FILED MAY 1, 1909.
963,033.
Patented July 5, 1910.
6 SHEETS—SHEET 5.
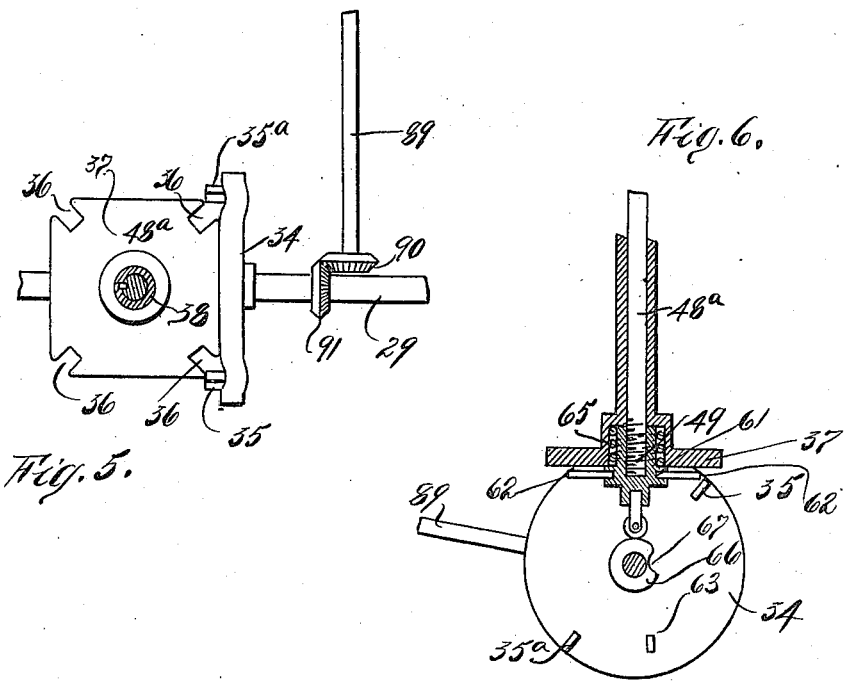
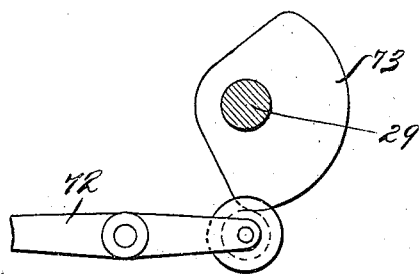
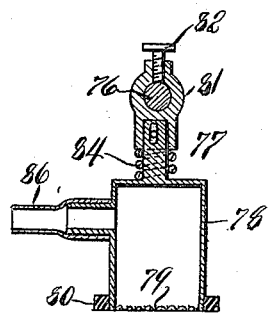
Witnesses:
C. A. Jarvis
Estelle Hamburger.
Inventors.
Arnold Cohn
Louis M. Kronheimer
by Manning Block
Attorney.

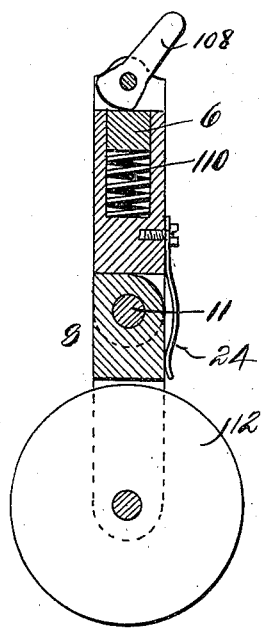
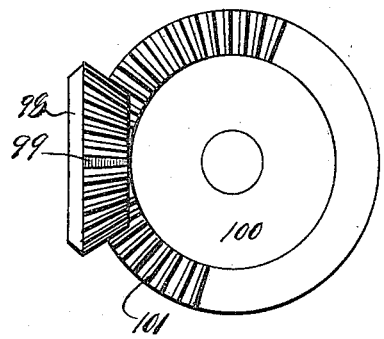
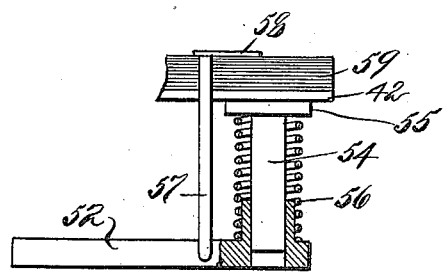
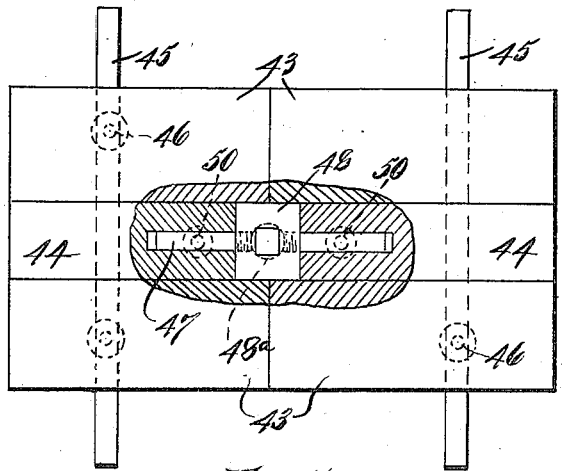

UNITED STATES PATENT OFFICE.

ARNOLD COHN AND LOUIS M. KRONHEIMER, OF NEW YORK, N. Y.

GLUE-APPLYING MACHINE.

963,033.  Specification of Letters Patent.  Patented July 5, 1910.

Application filed May 1, 1909. Serial No. 493,273.

*To all whom it may concern:*

Be it known that we, ARNOLD COHN and LOUIS M. KRONHEIMER, citizens of the United States, residing at New York city, Manhattan borough, county and State of New York, have invented certain new and useful Improvements in Glue-Applying Machines, of which the following is a clear, full, and exact description.

This invention relates to glue applying machines, but more particularly to that class of glue applying machines which are used to apply glue to sheets of paper which are afterward applied to boxes, or other articles, to form covers therefor.

In the following description the construction of our improved machine will be fully set forth, the novel features of which we will finally claim, reference being had to the accompanying drawings, forming part hereof, wherein:—

Figure 1 is a top plan view of our improved machine; Fig. 2 is an end view looking from the left in Fig. 1; Fig. 3 is a side elevation looking from the right in Fig. 2; Fig. 4 is a similar view looking from the left in Fig. 2; Fig. 5 is a sectional plan view, the section being taken on a line $a$—$a$ in Fig. 2; Fig. 6 is a vertical sectional view, the section being taken on a line $b$—$b$ in Fig. 2; Fig. 7 is a sectional view of one of the vacuum grippers of our improved machine; Fig. 8 is a detail view of one of the paper clamps of our improved machine; Fig. 9 is a detail view of the interrupted-teeth pinion which operates the vacuum pump; Fig. 10 is a vertical sectional view of one of the automatically movable glue applying elements; Fig. 11 is a detail view of the paper carrying element; and Fig. 12 is a vertical sectional view, taken on a line $c$—$c$ in Fig. 2, showing the presser-foot cam, other parts being omitted.

Referring to the drawings, our improved glue applying machine comprises, in this instance, a pair of frames 1 suitably secured to the base-plate 2 (see Fig. 2). The table 3 of the frames 1 supports a pair of frames 4, which are provided at the top thereof with a guide 5 upon which a cross-head 6 is adapted to reciprocate. The cross-head 6 adjustably supports a plurality of frames 7 and 8, the frame 7 being secured in an adjusted position by means of set screws 9, and the frames 8 by means of adjustably secured collars 10. The frames 7 and 8 are composed of two parts pivotally secured together as at 11, each frame rotatably supporting a glue applying element or wheel 12. To apply glue to the wheels 12, we employ, in this instance, a roller 13 which is constantly rotated by a belt 14 (see Fig. 4) in a glue-pot 15, the said glue-pot being pivotally mounted on the frames 1 by means of the arms 16. The arms 16, pot and roller carried thereby, always tend to move toward the wheels 12 owing to the pull of the springs 17 and 18 (Figs. 3 and 4). The belt 14 is operated by a pulley 19 (Fig. 4) which is carried by a rotatable shaft 20, the said shaft being rotated by a pulley 21 from a source not shown. To compensate for the movement of the roller 13 and pot 15 we have provided an idle pulley 22 which is mounted on a swivel arm 23. The weight of the arm and pulley is sufficient to take up any slack in the belt 14, and the springs 17 and 18 have sufficient tension to elevate the pulley 22 as the roller and pot are pulled forward. The purpose of mounting the glue-roller in this manner is to insure a perfect contact with the wheels 12, for the reason that, when the wheels are caused to travel toward the opposite end of the frame, the springs 17 and 18 will pull the roller forwardly, and when the wheels return they will contact the roller a little before the end of their stroke whereby the roller is pushed backwardly by the said wheels, whereby a firm contact is assured.

To adapt the frames 7 and 8 to coöperate with the resiliently mounted roller for the purpose of effecting a firm contact against the glue-roller, we place adjacent the pivotal connection 11 a spring 24, which acts to aline the lower half of the said frames with the upper half should any of the lower halves be forced out of line with their respective upper halves, when the wheels contact the roller 13.

To reciprocate the cross-head 6, to cause the wheels 12 to apply glue to the paper, we provide arms 25 (Figs. 1, 3 and 4) which are loosely mounted on the shaft 20, the arms 25 being connected to the cross-head 6 by means of the links 26.

To operate the arms 25 we provide disks 27 and 28 which are carried by a counter shaft 29, the arms 25 and disks being connected by links 30. The counter shaft 29 is operated by a pulley 31 through a belt 32 driven by a pulley 33 on the shaft 20.

As can be seen in Fig. 2, the counter shaft 29 carries a disk 34 which is provided with teeth 35 and 35ᵃ, (see also Fig. 6) which are disposed diametrically opposite upon the face of the said disk. The teeth 35 and 35ᵃ are adapted to enter slots 36 (Fig. 5) in a star wheel 37 which, in turn, is carried by and actuates a tubular shaft 38 which at 39 has connected thereto a table 40. The star wheel 37 and table 40 are turned one quarter of a revolution for every half revolution of the disk 34, which is quite obvious. This form of mechanical movement is well known in the arts.

The table 40 supports, by means of the clamps 41, an adjustable paper holder 42, which is composed of the laterally extensible members 43 (see Fig. 11) and the longitudinally extensible members 44. To adjustably support the members 43 we have provided pins 45, which are securely held by the members 44, set screws 46 being provided to hold the members 43 in an adjustable position. The members 44 are carried by pins 47 carried by the block 48, which block is carried by and movable upon a rotatable spindle 48ᵃ within the tubular shaft 38. Set screws 50 are provided to hold the members 44 in position. It is quite apparent that the members 43 and 44 can be adjusted transversely or longitudinally, or both, to suit different sizes of paper.

The table 40 is provided with tee slots 51 (Fig. 1) in order that the clamps 41 can be adjusted to suit different sizes of the holder 42. The clamps 41 comprise a base 52 (Fig. 1), which may be secured to the table 40 by bolts 53, and a vertically movable spindle 54 having a head 55, there being a spring 56 interposed between the head 55 and base 52. The other element of the clamp consists of a pin 57 provided at the top thereof with a head 58 adapted to lie over and contact and hold the upper sheet of a pile of paper 59. When a pile of paper is placed upon the holder 42, the spindle 54 will be depressed, as well as the holder 42, there being a spring 60 permitting such depression. The pile of paper can then be placed between the holder 42 and heads 58, as shown in Fig. 8. As can be seen in Fig. 1 the four corners of the pile are clamped by the clamps 41.

In order that the holder 40 will move up to the extent of the thickness of the removed sheets of paper, we provide the spindle 48ᵃ threaded at the lower end 49 and mount upon the said threads a rotatable nut 61, the said nut being provided with a plurality of outwardly extending pins 62, the number of the pins being predetermined and varying with different thickness of paper.

To actuate the nut 61, we place upon the disk 34 a tooth 63, which, when the disk is rotated, strikes one of the pins 62 and rotates the nut 61 sufficiently to raise the holder 42 the distance of the thickness of one sheet of paper, when said sheet has been removed, by the automatic sheet remover 64.

As can be seen in Fig. 6, the hub of the star wheel is counterbored and a spring 65 inserted between the nut 61 and bottom of the said counterbore. This spring acts to pull the paper holder 42 downwardly at the proper time. The holder 42 is pushed upwardly again, after having been lowered, by a cam 66. The depression 67 in the said cam permits the spring 65 to force the holder 42 downwardly.

To hold the top sheet of the pile down, while glue is being applied thereto, we provide a presser-foot 68, consisting of the laterally adjustable parallel members 69, carried by the pins 70, held by an actuating frame 71. The frame 71 projects downwardly and is connected to an arm 72 (Fig. 3) which in turn is raised by a cam 73 (see Fig. 12). A spring 74 returns the presser-foot after it has been raised from the pile of paper.

To remove a sheet of paper after glue has been applied thereto, we provide the said automatic remover 64, which comprises a frame 75 carried by an oscillating disk 76, which is rotatably mounted upon one of the frame members 1, as shown. The frame 75 is provided with cross-bars 76 each of said bars being provided with suckers or grippers 77 (see Fig. 7). The suckers 77 consist of a cylindrical or hollow member 78, having a screen 79 at the bottom thereof, a rubber pad or band 80, being provided adjacent the lower end of the cylinders in order to assure a firm, comparatively air-tight contact with the paper.

The suckers 77 are carried by adjustable blocks which are adapted to slide along the bars 76 and to be held in any desired position by set screws 82. The frame 75 is also extensibly connected as at 83. Between the suckers 78 and blocks 81 we insert a spring 84 in order that the said suckers may accommodate themselves to the surface of the paper.

The frame 75 carries a junction tube 85 from which tubes 86, preferably rubber, extend to the suckers 77. The junction tube is connected to a vacuum pump 87 (see Fig. 2) by a tube 88. The pump 87 is operated by a shaft 89 (Fig. 3) which in turn is operated by the gear and pinion 90 and 91, the pinion 91 being carried by the shaft 29.

To operate the disk 76, which moves the frame 75 in position at the proper time, we provide a second disk 92 (see Fig. 4) which is connected to the disk 76 by a link 93. The disk, 92, is carried by a rotatable shaft 94 provided at the lower end with a gear 95, the said gear being in mesh with a pinion 96 carried by a stub shaft 97 (see Fig. 2), which at the opposite end is provided with a gear 98, having teeth interrupted at 99 (see Figs. 5 and 9). The pinion 98 is rotated by a gear 100, having teeth 101, there being as many teeth 101 as there are teeth on the gear 98. It will be noticed that the link is pivoted nearer the center of the disk 92 than it is to the center of the disk 76. By this construction the disk 76 will be oscillated back and forth once for every revolution of the disk 92.

In order to prevent the suckers 77 from sliding upon the paper, thereby tearing same, when they are brought into position for removing a sheet, we provide a tapered horn 102 (Figs. 3 and 4) which will contact the frame 75 when the frame is swung inwardly thereby causing the said frame, as it continues to move, to rise. When the frame reaches the end of the horn it will fall into the notch 103 at which time the suckers 77 will fall directly upon the paper. When the frame 75 is to be withdrawn a rod 104 is moved upwardly, by a cam face 105, on the disk 28, and pushes the frame 75 out of the notch 103, whereby it can be swung back to its normal position.

The machine operates as follows: Supposing a pile of paper be in position, on the holder 42. We throw in the clutch 106 (Fig. 2) and the machine will start. When the machine starts the shaft 29 will rotate, for instance, in the direction of the arrow 107 in Fig. 3. This will cause the cross-head 6 to travel forwardly, thereby causing the center wheels 12 to contact the top sheet of paper and apply glue thereto in the form of lines. When the cross-head reaches the end of its stroke the levers 108 will strike the bar 109 and raise the center wheels 12 upwardly against the tension of the springs 110 (see Fig. 10); during this cycle of movements the presser-foot 68 will remain down, and the rod 111 of the pump 88 will be coming up, and when the cross-head has reached the end of its stroke, the piston of the pump will be half way up; the piston travels much slower than the cross-head 6. Just before the cross-head has reached the end of its stroke the pin 35$^a$ on the disk 34 will engage the slot 36 adjacent thereto, and when the cross-head has reached the end of its stroke the star-wheel 37, table 40 and paper holder 42 will have been given a quarter turn, thereby placing the said holder at a right angle to its former position. Just before the star-wheel commences to turn, the presser-foot will be raised by the cam 73, thereby allowing the paper holder and adjuncts to be given the above mentioned turn.

Upon the return stroke of the cross-head and while the presser-foot is up, the teeth 101 on the pinion 100 will mesh with the teeth on the gear 98; the said meshing will be timed to occur at about the time the outside wheels 12, the inside wheels being raised, contact the top sheet of paper. At about the time the said outside wheels leave the paper, thereby applying glue in the form of lines at an angle to the glue previously applied, the suckers will have been brought inwardly and caused to rest upon the top sheet. As soon as the suckers have contacted the top sheet, the notch 67 in the cam 66 will be opposite the roller on the end of the spindle 48$^a$. In the meantime the piston has been drawn up thereby creating a vacuum in the suckers 77. As soon as the said notch has reached the aforesaid position the spring 65 will force the holder 42 downwardly, thereby leaving the top sheet stuck to the suckers 77. By this time the pin 63 will have contacted one of the pins 62. During the remainder of the backward stroke of the cross-head the frame 75 will have been thrown outwardly to its normal position, the vacuum broken by a slight lowering of the piston, the nut 61 given a slight turn thereby raising the holder 42 to the extent of the thickness of a sheet of paper. Just before the cross-head reaches its backward position, to contact the glue roll 13, the tooth 35 gives the star-wheel and holder 42 a quarter turn thereby bringing the holder to its normal position; the presser-foot will also come in contact with the paper at the end of this latter movement of the cross-head.

When the holder has been depressed as aforesaid the spindle 54 of the grippers 41 will also depress thereby taking the pressure off the paper so that the suckers can remove the top sheet. When the holder rises again the spring will extend the thickness of the removed sheet whereby the next succeeding top sheet is subjected to pressure.

The above mentioned action of the wheels 12 and holder 42 causes glue to be applied to the paper in the form of lines at an angle to each other.

When the cross-head reaches its extreme backward position the levers 108 will strike the bar 113 whereby the center wheels will lower again for another operation.

It will be understood that all cams, gears with interrupted teeth and other elements requiring timing will be timed to bring about the above mentioned results.

After a sheet of paper has been removed from the pile it may be deposited on or into any suitable receptacle.

The cam face 105 on the disk 28 is so positioned as to force the rod 104 upwardly to push the frame 75 out of the slot 103 as soon as a sheet has become stuck to the suckers.

To avoid complication the tubes which connect the suckers and the junction box have been omitted in Fig. 4.

Having now described our invention, what we claim and desire to secure by Letters Patent is:

1. In a glue applying machine, a plurality of glue applying elements, an intermittently rotatable table adapted to hold a pile of paper, a paper holding device adapted to automatically adjust itself to the thickness of said pile after a sheet has been taken therefrom, and a pneumatic device adapted to take the paper from said table.

2. In a glue applying machine, glue applying elements, a table adapted to hold a pile of paper, means adapted to intermittently rotate said table, a presser-foot adapted to hold down the top sheet of said paper, and means adapted to carry said presser-foot away from said top sheet when said table is to be rotated.

3. In a glue applying machine, glue applying elements, a table adapted to hold a pile of paper, means adapted to intermittently rotate said table, a presser-foot adapted to hold down the top sheet of said paper, means adapted to carry said presser-foot away from said top sheet when said table is to be rotated, and means adapted to automatically remove the top sheet of paper after glue has been applied thereto.

4. In a glue applying machine, glue applying elements, a rotatable table, adapted to hold a pile of paper, a presser-foot adapted to hold down the top sheet of said pile, an operating shaft, means actuated by said operating shaft adapted to operate said presser-foot, means adapted to automatically remove the top sheet of said pile after glue has been applied thereto, and means also operated by said operating shaft adapted to operate said top sheet removing means.

5. In a glue applying machine, glue applying elements, a rotatable table, adapted to hold a pile of paper, a presser-foot adapted to hold down the top sheet of said pile, an operating shaft, means actuated by said operating shaft adapted to operate said presser-foot, a pneumatic device adapted to automatically remove the top sheet of said pile after glue has been applied thereto, and a pump also actuated by said operating shaft and adapted to actuate said pneumatic device.

6. In a glue applying machine, glue applying elements, a rotatable table, a vertically movable paper holder carried by said table, means adapted to depress said holder at intervals, and means adapted to automatically remove paper from said holder when depressed.

7. In a glue applying machine, glue applying elements, a rotatable table, a vertically movable paper holder carried by said table, means adapted to depress said holder at intervals, means adapted to automatically remove paper from said holder when depressed, and an automatically movable presser-foot adapted to hold said paper in position on the holder therefor.

8. In a glue applying machine, glue applying elements, an intermittently rotatable table, a paper holder carried thereby, means adapted to depress said paper holder at intervals, and an automatically operable pneumatic device adapted to remove paper from said holder when depressed.

Signed at New York city, N. Y., this 29 day of April 1909.

ARNOLD COHN.
LOUIS M. KRONHEIMER.

Witnesses:
EDWARD A. JARVIS,
ESTELLE HAMBURGER.